(12) United States Patent
Barajas et al.

(10) Patent No.: US 9,221,170 B2
(45) Date of Patent: Dec. 29, 2015

(54) METHOD AND APPARATUS FOR CONTROLLING A ROBOTIC DEVICE VIA WEARABLE SENSORS

(71) Applicant: GM GLOBAL TECHNOLOGY OPERATIONS LLC, Detroit, MI (US)

(72) Inventors: Leandro G. Barajas, Harvest, AL (US); Jinhan Lee, Atlanta, GA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 237 days.

(21) Appl. No.: 13/916,741

(22) Filed: Jun. 13, 2013

(65) Prior Publication Data

US 2014/0371906 A1   Dec. 18, 2014

(51) Int. Cl.
| | |
|---|---|
| B25J 9/16 | (2006.01) |
| B25J 9/22 | (2006.01) |
| B25J 13/08 | (2006.01) |
| B25J 13/02 | (2006.01) |
| G06F 3/01 | (2006.01) |
| G06K 9/00 | (2006.01) |
| G05D 1/08 | (2006.01) |

(52) U.S. Cl.
CPC .............. *B25J 9/1612* (2013.01); *B25J 9/1664* (2013.01); *B25J 13/02* (2013.01); *B25J 13/08* (2013.01); *G06F 3/017* (2013.01); *G06K 9/00355* (2013.01); *G05B 2219/35444* (2013.01); *Y10S 901/02* (2013.01)

(58) Field of Classification Search
CPC .......... B25J 13/02; B25J 13/08; B25J 9/1612; B25J 3/014; B25J 3/017
See application file for complete search history.

(56) References Cited

U.S. PATENT DOCUMENTS

| | | | | |
|---|---|---|---|---|
| 2005/0212767 | A1* | 9/2005 | Marvit et al. | 345/158 |
| 2008/0192005 | A1* | 8/2008 | Elgoyhen et al. | 345/158 |
| 2009/0180668 | A1* | 7/2009 | Jones et al. | 382/103 |
| 2010/0023314 | A1* | 1/2010 | Hernandez-Rebollar | 704/3 |
| 2012/0313847 | A1* | 12/2012 | Boda et al. | 345/156 |
| 2013/0082922 | A1* | 4/2013 | Miller | 345/156 |
| 2014/0240223 | A1* | 8/2014 | Lake et al. | 345/156 |

OTHER PUBLICATIONS

Neto, Pedro, J. Norberto Pires, and Antonio Paulo Moreira. "Accelerometer-based control of an industrial robotic arm." Robot and Human Interactive Communication, 2009. RO-MAN 2009. The 18th IEEE International Symposium on. IEEE, 2009.*
Ryoji Onodera and Nobuharu Mimura (2009). 6-DOF Motion Sensor System Using Multiple Linear Accelerometers, Humanoid Robots, Ben Choi (Ed.), ISBN: 978-953-7619-44-2, InTech.*

* cited by examiner

*Primary Examiner* — Khoi Tran
*Assistant Examiner* — Dale Moyer

(57) ABSTRACT

A method of training a robotic device to perform predetermined movements utilizing wearable sensors worn by a user. A position and movement of the user is sensed in response to signals from the wearable sensors. The wearable sensors include at least one six-degree of freedom accelerometer. Gestures are recognized by a gesture recognizer device in response to the signals. A position, orientation, and velocity of the user are estimated by a position and orientation processing unit. The sensed gesture inputs and the estimated position, orientation, and velocity inputs of the wearable sensors are received within a service requester device. The gestures, orientations, positions, and velocities are converted into predefined actions. Controls signals are output from the service requester device to a robot controller for executing the predefined actions.

19 Claims, 3 Drawing Sheets

METHOD AND APPARATUS FOR CONTROLLING A ROBOTIC DEVICE VIA WEARABLE SENSORS

BACKGROUND OF INVENTION

An embodiment relates generally to human machine interface devices.

Robots are often trained using predefined movements that are coded into a robot controller. The issue with current training systems is such system either teach-pendants or preprogrammed locations from simulation which are used to control robot position and velocity during commissioning, maintenance, and troubleshooting processes. Such interactions with robots are not natural to a human operator and require extensive training. For robot programming changes, it would be more effective to have human robot interface which provides not only control accuracy but also an intuitive process for the operator.

Preprogrammed locations from simulation are accurate but are not suitable for field programming and require a high skilled engineer to conduct the simulations. Teach-pendant is designed for field operation and may support most robot basic and programming functions, a user can only control the robot in one axis/direction at a time. Therefore, it requires extensive operation training and is not very efficient. A six degree of freedom device used as mouse does not take into consideration gravity. As a result, this system does not provide position and orientation. To obtain orientation and position, a device must be able to identify its position in space. That is, to understand the ending position, the initial position must first be identified and that requires that position, orientation, and motion of the device is known.

SUMMARY OF INVENTION

An advantage of an embodiment is the use of six 3-dimensional accelerometers for training movements of a robot. The system provides a robot control interface by interpreting 3-dimensional accelerometer signals as one of three different signals such as gestures, orientation, position/velocity/acceleration) within a finite state machine. The system recognizes gestures or sequence of gestures, which are mapped to predefined actions, and it sends signals mapped to predefined actions into a robot controller for executing movements of the robotic device. The system also estimates orientation and position of the wearable sensor device which may be mapped directly or indirectly to an end effector or to robotic joints.

An embodiment contemplates a method of training a robotic device to perform predetermined movements utilizing wearable sensors worn by a user. A position and movement of the user is sensed in response to signals from the wearable sensors. The wearable sensors include at least one six-degree of freedom accelerometer. Gestures are recognized by a gesture recognizer device in response to the signals. A position, orientation, and velocity of the user are estimated by a position and orientation processing unit. The sensed gesture inputs and the estimated position, orientation, and velocity inputs of the wearable sensors are received within a service requester device. The gestures, orientations, positions, and velocities are converted into predefined actions. Controls signals are output from the service requester device to a robot controller for executing the predefined actions.

An embodiment contemplates a human machine interface system for training a robotic device by a human operator. A robot controller controls movement of a robotic device. A wearable sensing device includes at least one six-degree of freedom accelerometer that senses position and orientation of the wearable sensing device. A movement of the wearable sensing device is used to control a movement of the robotic device via the robotic controller. A service provider device is in communication with the wearable sensing device for receiving position and orientation data from the wearable sensing device. The service provider device includes a gesture recognition device and a position and orientation processing device. The gesture recognition device identifies gestures generated by the wearable sensors, the position and orientation processing device estimating position, orientation, and velocity of the wearable sensors. A service requester device includes a control signal generator and a control state machine. The control signal generator integrates data received from the gesture recognition and from the position and orientation processing device for generating control signals and providing the control signals to the robotic device. The control state sub-module identifies transitions states that include null states, static states, and motion states. The robotic device is trained to perform a respective operation by the identifying a sequence of gestures, orientations, positions, and velocities as sensed by the wearable sensing device. The sequence of gestures, orientations, positions, and velocities are converted to predefined actions and executed via the robot controller.

DETAILED DESCRIPTION

Figure 1:
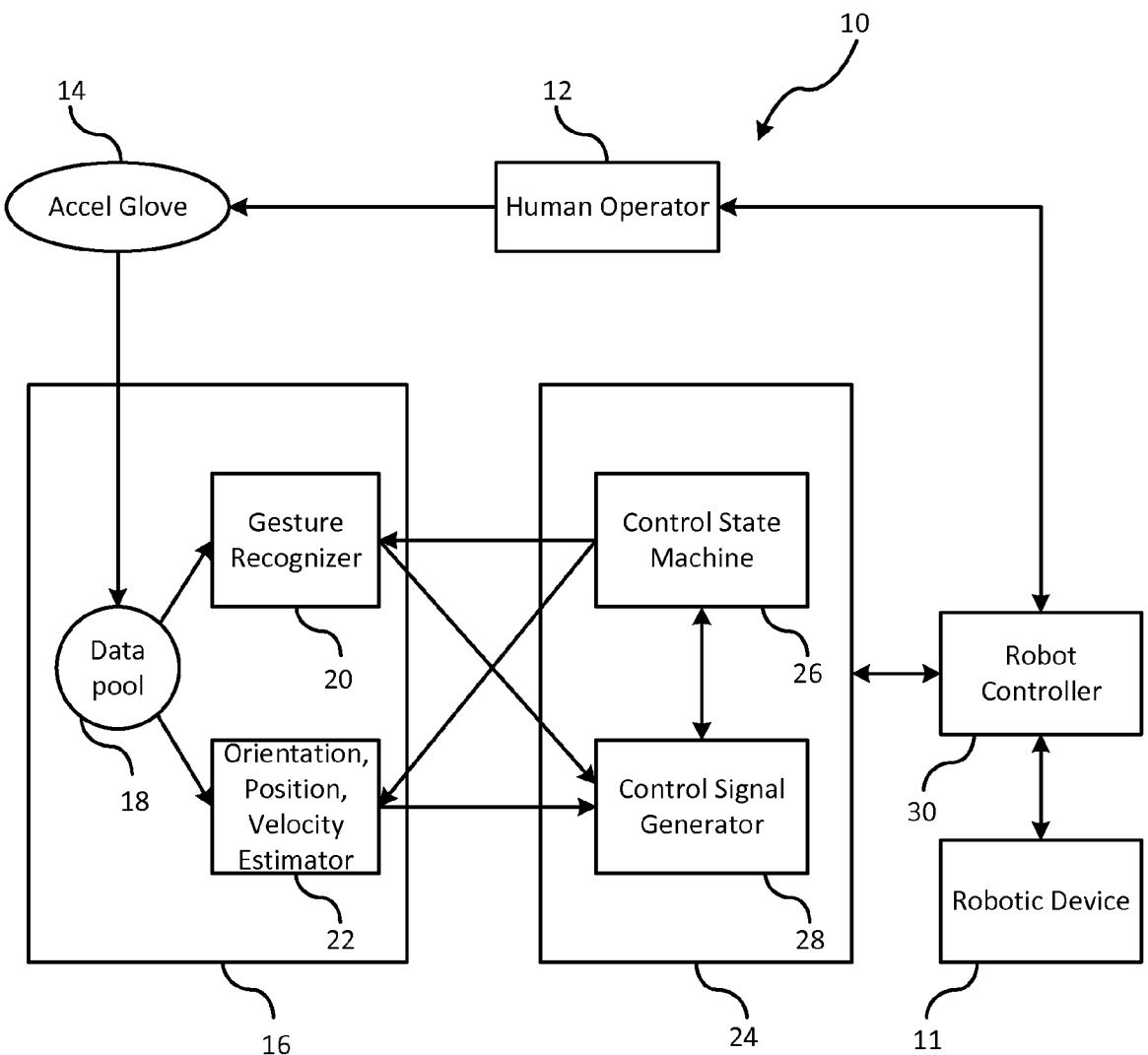
FIG. 1 is a block diagram of the architecture for human machine interface system.

There is shown in FIG. 1, a block diagram of the architecture for human machine interface system 10 for training a robotic device 11 by a user 12 such as a human operator. The system 10 includes wearable sensors 14 worn by a user 12 that senses movements and orientation as executed by the user 12. The wearable sensors 14 are preferably a wearable glove that senses the position, orientation, and movement of the user as the user moves the wearable glove from a first location to a second location.

The wearable glove includes at least one six-degree of freedom accelerometer. A six-degree of freedom accelerometer provides data for estimating a position and orientation. A position is represented by three linear coordinates (e.g., x, y, z) and an orientation is represented by three angular parameters (e.g., pitch, roll, yaw). Preferably, an accelerometer is placed on each finger of the wearable glove and in the palm of the wearable glove. It should be understood that other configurations may be used aside from a wearable glove that may include more or less accelerometers.

The accelerometer data is provided to a server device 16. The server device 16 includes a database 18 for collecting accelerometer data from the wearable sensors 14, a gesture recognizer device 20 for identifying gestures generated by the wearable sensors 14, and a position and orientation processing unit 22 for estimating position, orientation, and velocity of the wearable sensors 14.

The gesture recognizer device 20 recognizes poses or a sequence of poses of the wearable sensors 14 based on the data obtained from the wearable sensors 14. Gestures include static gestures and dynamic gestures. An example of a static gesture may include still gestures such as sign language. Dynamic gestures include motion that that can be recognized from previously learned dynamic gestures, such as a hand-waving motion used to represent a do-over command. The gestures represent control commands executed by the user wearing the wearable sensors 14 for commanding the robot device to perform an action. Such control commands include discrete actions, velocity commands, and position commands.

The gesture recognizer device 20 is preferably a classifier such as a state space vector classifier. The state space vector classifier utilizes a received set of input data and predicts which class each input is a member of. The state space vector classifier determines which category an input belongs to. For a respective set of training examples with each belonging to one of two categories, the classifier is built as a model that assigns new examples into one of the two categories. A state space vector classifier maps the each input as points in space so that when the inputs are aggregately mapped, the two categories are divided by a separation space that clearly distinguishes between the two categories. New inputs may be mapped into the same space and are predicted as to which category they pertain based on which side of the separation space they are situated.

The position and orientation processing unit 22 determines a position of each respective wearable sensor, the orientation of the each respective wearable sensor, and the velocity and acceleration of each respective wearable sensor based on the data obtained from the wearable sensors 14. The position and orientation of the wearable sensors 14 may be estimated utilizing a single pass iteration (continuous/instantaneous) or a iterative estimation (delayed integration).

A service requestor device 24 request position, orientation, and gesture information from the service provider 16. The service requestor device 24 includes a control state machine 26 and a control signal generator 28. The service requestor device 24 is in communication with a robot controller 30 that interacts robotic device 11 for controlling movements of the robotic device 11.

The control state machine 26 identifies the various states and transitions between the various states. The control state machine 26 defines the actions that are used in processing the sampled data. As a result, based on the identified transition between two states as determined from the data provided by the gesture recognizer device 20 and the position and orientation processing unit 22, a determination is made whether to store, discard, buffer, or process the sampled data. The following are actions illustrating state-to-state transition:

Null to Null: Discarding sample;
Null to Static: Processing the current sample;
Static to Static: Processing the current sample;
Static to Motion: Putting the sample into the delay buffer;
Motion to Motion: Putting the sample into the delay buffer; and
Motion to Static: Processing all the motion samples.

Figure 2:
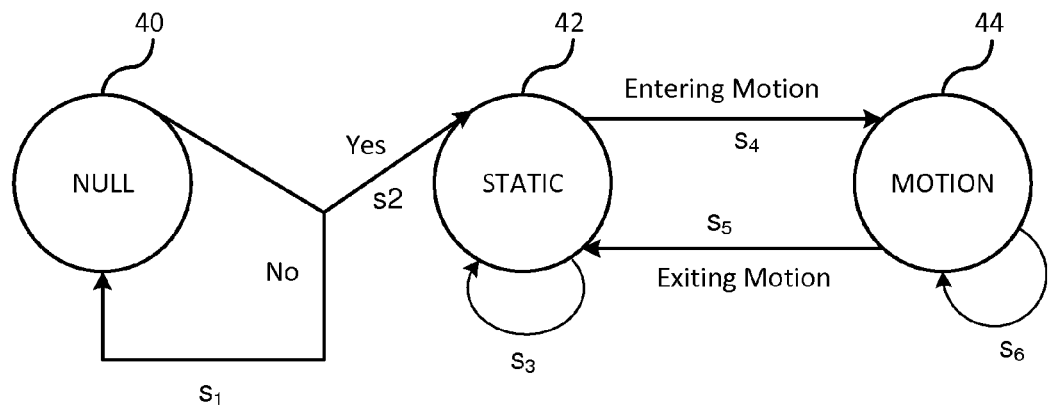
FIG. 2 is a state flow diagram for a control state machine

FIG. 2 illustrates a state flow diagram for a control state machine. A null state 40, a static state 42, and a motion state 44 is illustrated. In transitioning from the null state to the static state, a determination is made whether enough static samples are available. If the determination is made that not enough static samples are available, then the transition returns to the null state 40 and the samples are discarded as indicated by $s_1$.

If the determination is made that enough samples are obtained, then the routine transitions to the static state where the current samples are processed as indicated by $s_2$.

If in the static state, the routine transitions back to the static state from the static state as indicated by $s_3$, then the current samples are processed.

A transition from the static state to the motion state as indicated by $s_4$ indicates that an accelerometer is entering motion. Samples are input into a buffer where processing of the samples is delayed. Similarly, if the routine transitions back to the motion state from the motion state as indicated by $s_5$, then the samples are input into a buffer where processing of the samples is delayed.

Transitioning from the motion state to the static state as indicated by $s_6$ indicates that the accelerometer is exiting motion. All motion samples are processed during this transition.

When the sampled data is processed, the sampled data is input to the gesture recognizer device 20 for determining whether the movement by the accelerometers represents a gesture. The sampled data is also provided to an orientation, position, and velocity processing unit 22 for determining a position of the accelerometer. Based on the gesture and positioning determination that are input to the control signal generator 28, the control signal generator 28 generates a control signal that identifies a next movement of the robotic device 11. The control signals are input to a robot controller 30 where the input signals are processed and converted to the proper formatted code for executing robotic movements as determined. After the movement of the robotic device 32 is executed, visual execution is observed by the human operator 12 for training a next movement.

Figure 3:
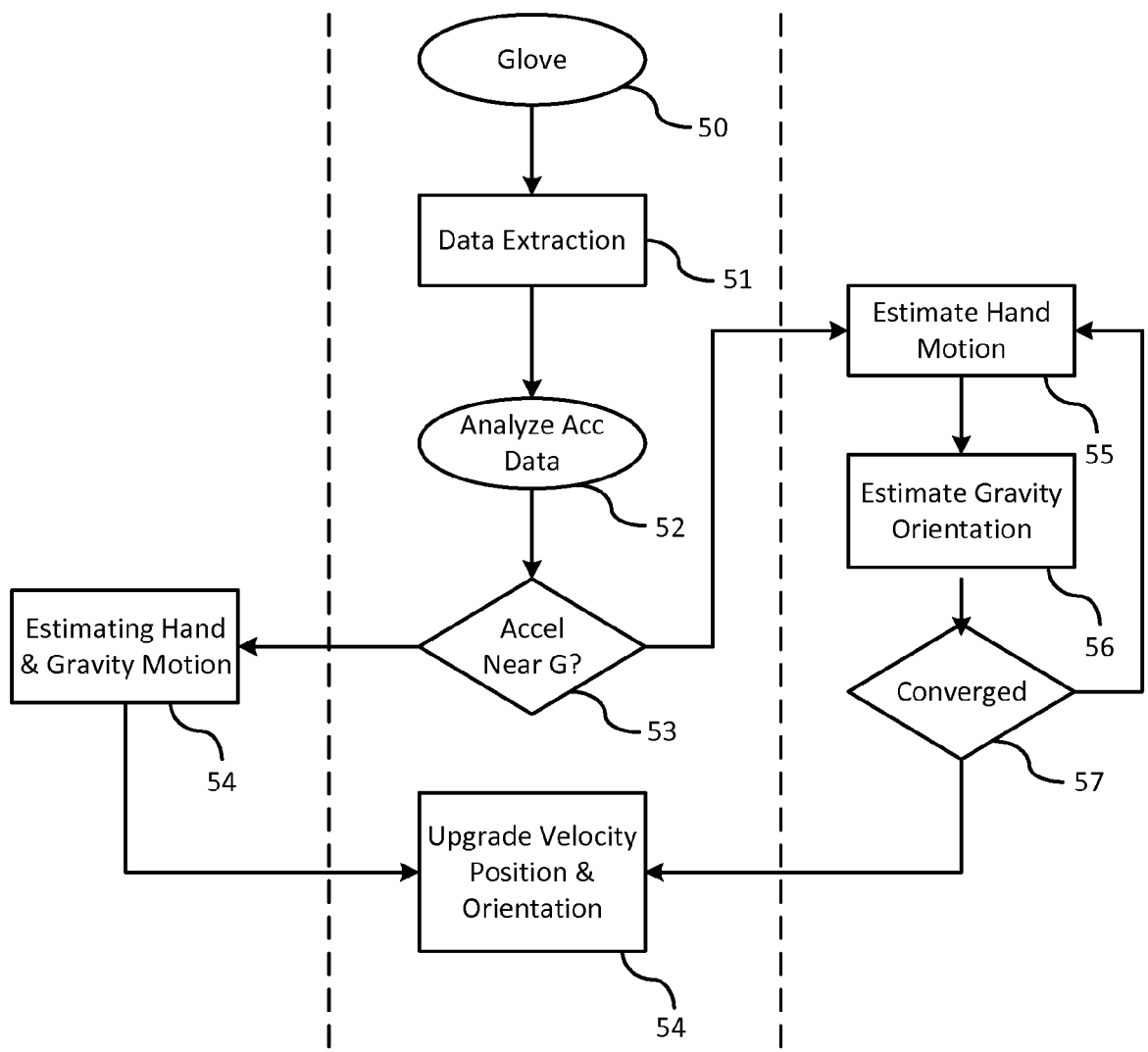
FIG. 3 a position and orientation technique that is executed by the position and orientation processing unit.

FIG. 3 illustrates a position and orientation technique that is executed by the position and orientation processing unit. The position and orientation technique utilizes single pass estimation or iterative estimation based on whether the acceleration is near 1G (9.8 m/s$^2$). In block 50, a wearable sensor device such as an accelerometer glove is put into motion by the user. One or more gestures are generated by the user.

In block 51, data extraction is obtained from the wearable sensor device.

In block 52, the acceleration data is analyzed to determine if the wearable sensors are moving. The acceleration data provides an acceleration reading. The net acceleration may be obtained based on the following formulas:

$$\text{Net Acceleration}_{(G)} = (\text{AccelerometerData} - \text{Bias})/\text{Gain}$$

$$\text{Net Acceleration}_{(G)} = \text{Rot}_{(W) \to (G)}(\text{Gravity Acc}_{(W)} + \text{Motion Acc}_{(W)})$$

Motion may then be further derived and represented by the formula:

$$\text{Motion Acc}_{(W)} = \text{Rot}_{(G) \to (W)}(\text{Net Acceleration}_{(G)}) - (\text{Gravity Acc}_{(W)})$$

Velocity is the integration of motion over time and may be represented by the following formula:

$$\text{Velocity} = \int(\text{Motion Acc}_{(W)}/\text{Time}).$$

Position is the double integration of motion over time and may be represented by the following formula:

$$\text{Position} = \iint(\text{Motion Acc}_{(W)}/\text{Time}).$$

In block 53, a determination is made whether the wearable sensors are moving. This determination is based on whether the acceleration is approaching G. If the determination is made that the acceleration is approaching G, then the determination is made that the wearable sensors are moving and the routine proceeds to step 54. If the determination is made that the acceleration is not approaching G (e.g., moving), then the routine proceeds to step 55.

In step 54, in response to the determination that the acceleration is approaching G, a single pass estimation is performed. This involves instantaneously determining the hand and gravity motion as one continuous motion from a first location to a second location. The routine proceeds to step 58.

In step 58, the velocity, position, and orientation of the wearable sensor device is updated.

In step 53, in response to the determination that acceleration is not approaching G, an iterative estimation is performed commencing at step 55. The iterative estimation may utilize an integration result delay, which assumes that the human operator would be static for a certain amount of time after the motion. Delayed results can be obtained on acceleration integration and interpolate gravity orientation throughout the path to minimize error. In such an instance, the finite state machine is utilized which uses null states, static states, and motion states. In such an instance, two static states are found (before and after motion). Motion detection is also utilized which utilizes features such as magnitude, differential, and variance.

In step 55, the hand motion is estimated in incremental steps, such as sample to sample, as opposed to an initial step to a final step.

In step 56, the gravity orientation is estimated in incremental steps.

In step 57, a determination is made as to whether the estimated hand motion and the estimated gravity orientation converges. If convergence is not present, then the routine returns back to step 55 to perform the next iterative process. If the determination is made, in step 57, that the convergence is present, then the routine proceeds to 58 where the velocity, position, and orientation of the wearable sensor device are determined. The estimated orientation and position of the wearable sensor device may be mapped directly or indirectly to an end effector or to joints of the robotic device.

Figure 4:
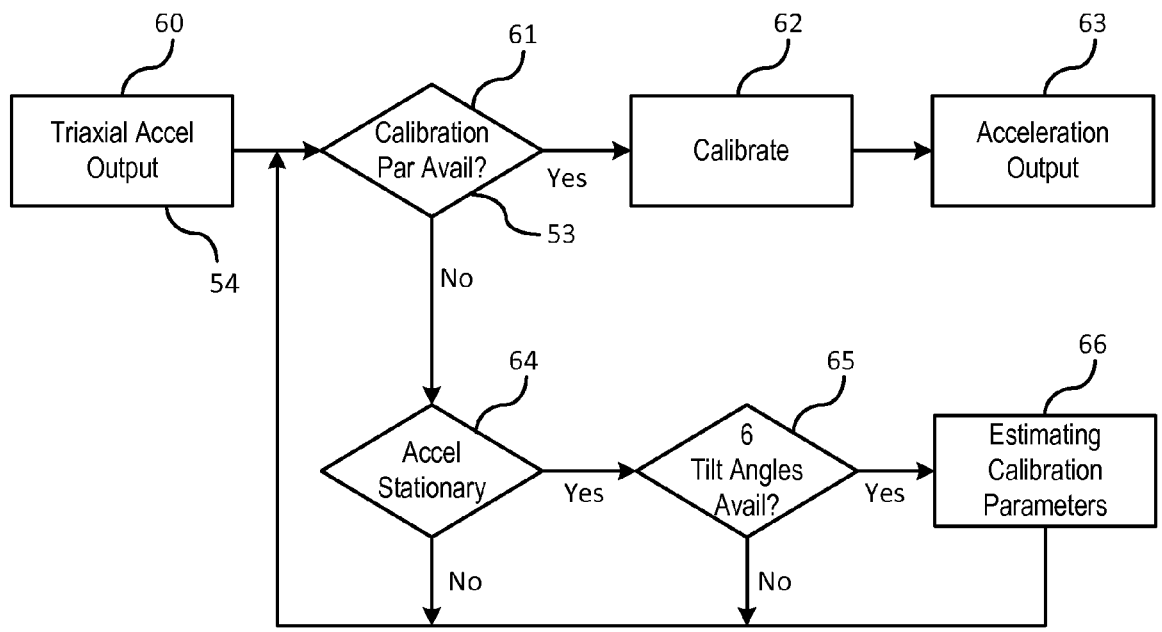
FIG. 4 is a flow diagram for providing sensor calibration.

It should be understood with each set of samples that are collected from a set of movements (e.g., an iterative pass) and noise is collected within the data. Noise is defined as measurement noise (error). Therefore, the more drift, the more noise that is accumulated in the data. Therefore, the noise must be compensated for or normalized utilizing an iterative calibration technique. The iterative calibration technique estimates three gain factors and three bias factors. FIG. 4 illustrates a flow diagram for providing sensor calibration.

In block 60, outputs are obtained from a triaxial accelerometer. That is, one accelerometer will have three axes, and each axis will have an associated sensor data output. Therefore, for the sensor wearable device as described herein, there are six accelerometers, so there will be eighteen readings total for the wearable sensor device.

In block 61, a determination is made whether the calibration parameters are available. If the determination is made that the calibration parameters are available, then routine proceeds to block 62; otherwise, the routine proceeds to block 64.

In block 62, the sensors are calibrated utilizing the calibration parameters.

In block 63, the acceleration data is output for processing and determining the gesture, orientation, and position of the wearable sensor device.

In response to the calibration parameters not available in step 61, the routine proceeds to step 64 where a determination is made whether the accelerometer is stationary. If the accelerometer is not stationary, then calibration parameters cannot be estimated at this time and a return is made to step 61. If the determination is made in step 64 that the accelerometers are stationary, then routine proceeds to step 65.

In step 65, a determination is made as to whether six tilt angles are available. If the six tilt angles are not available, then calibration parameters (e.g., gain and bias) cannot be estimated at this time and a return is made to step 61. If the determination is made in step 65 that the six tilt angle are available, then routine proceeds to step 66.

In step 66, the calibration parameters are estimated. The calibration parameters include gain factors and bias factors for each axis. After estimating the calibration parameters, the routine proceeds to step 61 for calibrating the triaxial accelerometers outputs.

While certain embodiments of the present invention have been described in detail, those familiar with the art to which this invention relates will recognize various alternative designs and embodiments for practicing the invention as defined by the following claims.

What is claimed is:

1. A method of training a robotic device to perform predetermined movements utilizing wearable sensors worn by a user, the method comprising the steps of:
    sensing a position and movement of the user in response to signals from the wearable sensors, the wearable sensors including at least one six-degree of freedom accelerometer;
    recognizing gestures by a gesture recognizer device in response to the signals;
    estimating a position, orientation, and velocity of the user by a position and orientation processing unit;
    receiving the recognized gestures and the estimated position, orientation, and velocity of the wearable sensors within a service requester device;
    converting the gestures, orientations, positions, and velocities into predefined actions; and
    outputting controls signals from the service requester device to a robot controller for executing the predefined actions;
    wherein a position, velocity and orientation of the wearable sensor is updated utilizing delayed integration, wherein transitioning the robotic device from a first position to a second position is delayed until the wearable sensors reach the second position.

2. The method of claim 1 wherein transition states between the first position and the second position are identified when utilizing delayed integration, the transition states include a null state, static state, and a motion state as detected by a control state machine.

3. The method of claim 2 wherein two static states are determined prior to a sensed movement and after the sensed movement of the wearable sensor.

4. The method of claim 3 wherein movement of the wearable sensors is detected based on a magnitude, a differential, and a variance of the wearable sensors, wherein the magnitude represents a distance that the wearable sensors moves, wherein the differential represents a speed of change in the movement, and wherein the variance indicates whether the wearable sensors is moving.

5. The method of claim 4 wherein the delayed integration utilizes gravity interpolation of the wearable sensors when transitioning the robotic device from the first position to the second position.

6. The method of claim 5 wherein the position and orientation of the wearable sensors after each integrated delay movement is corrected to compensate for errors.

7. The method of claim 5 wherein the gravity acceleration of the wearable sensors during the movement is interpolated utilizing quaternion averaging.

8. The method of claim 1 wherein the estimated position is identified by three linear coordinates and the orientation is represented by three angular parameters.

9. The method of claim 1 wherein the predetermined movements include a start position, an interim position, and a final position.

10. A human machine interface system for training a robotic device by a human operator, the system comprising:
 a robot controller for controlling movement of a robotic device;
 a wearable sensing device including at least one six-degree of freedom accelerometer that senses position and orientation of the wearable sensing device, a movement of the wearable sensing device being used to control a movement of the robotic device via the robotic controller;
 a service provider device in communication with the wearable sensing device for receiving position and orientation data from the wearable sensing device, the service provider device including a gesture recognition device and a position and orientation processing device, the gesture recognition device identifying gestures generated by the wearable sensors, the position and orientation processing device estimating position, orientation, and velocity of the wearable sensors;
 a service requester device including a control signal generator and a control state machine, the control signal generator integrating data received from the gesture recognition device and from the position and orientation processing device for generating control signals and providing the control signals to the robotic device, the control state machine identifying transitions states that include null states, static states, and motion states;
 wherein the robotic device is trained to perform a respective operation by the identifying a sequence of gestures, orientations, positions, and velocities as sensed by the wearable sensing device, wherein the sequence of gestures, orientations, positions, and velocities are converted to predefined actions and executed via the robot controller.

11. The system of claim 10 wherein the gesture recognizer is a state space vector classifier.

12. The system of claim 11 wherein the gesture recognizer recognizes dynamic gestures.

13. The system of claim 12 wherein the gesture recognizer recognizes static gestures.

14. The system of claim 13 wherein the wearable sensing device includes an accelerometer glove, wherein a six-degree of freedom accelerometer disposed on each finger of the glove and the six-degree of freedom accelerometer is disposed on a palm of the glove.

15. A method of training a robotic device to perform predetermined movements utilizing wearable sensors worn by a user, the method comprising the steps of:
 sensing a position and movement of the user in response to signals from the wearable sensors, the wearable sensors including at least one six-degree of freedom accelerometer;
 recognizing gestures by a gesture recognizer device in response to the signals, the gesture recognizer being a state space vector classifier;
 estimating a position, orientation, and velocity of the user by a position and orientation processing unit;
 receiving the recognized gestures and the estimated position, orientation, and velocity of the wearable sensors within a service requester device;
 converting the gestures, orientations, positions, and velocities into predefined actions; and
 outputting controls signals from the service requester device to a robot controller for executing the predefined actions.

16. The method of claim 15 wherein the gesture recognizer recognizes dynamic gestures based on an active movement of the wearable sensors between a first location and second location.

17. The method of claim 16 wherein the gesture recognizer recognizes static gestures of a static position and orientation of the wearable sensors.

18. A method of training a robotic device to perform predetermined movements utilizing wearable sensors worn by a user, the method comprising the steps of:
 sensing a position and movement of the user in response to signals from the wearable sensors, the wearable sensors including at least one six-degree of freedom accelerometer;
 recognizing gestures by a gesture recognizer device in response to the signals;
 estimating a position, orientation, and velocity of the user by a position and orientation processing unit;
 receiving the recognized gestures and the estimated position, orientation, and velocity of the wearable sensors within a service requester device;
 converting the gestures, orientations, positions, and velocities into predefined actions; and
 outputting controls signals from the service requester device to a robot controller for executing the predefined actions;
 wherein a position, velocity, and orientation of the wearable sensors is updated utilizing instantaneous integration, wherein transitioning the robotic device from a first training position to a second training position is instantaneously moved along a path of transition as the wearable sensors transitions from the first position to the second position.

19. The method of claim 18 wherein a sensor calibration for instantaneous integration estimates three gain factors and three biases for each six-degree of freedom accelerometer.

* * * * *